United States Patent [19]

Rowe

[11] E Re. 28,494

[45] Reissued July 29, 1975

[54] METHOD OF PROCESSING STAINLESS STEEL STRIPS OR SHEETS

[75] Inventor: Wilson S. Rowe, Valparaiso, Ind.

[73] Assignee: United States Steel Corporation, Pittsburgh, Pa.

[22] Filed: May 6, 1974

[21] Appl. No.: 447,457

Related U.S. Patent Documents

Reissue of:

[64] Patent No.: 3,776,784
Issued: Dec. 4, 1973
Appl. No.: 271,881
Filed: July 14, 1972

[52] U.S. Cl. ..... 148/12 EA
[51] Int. Cl.[2] ..... C21D 9/46
[58] Field of Search ..... 148/12 EA

[56] References Cited

UNITED STATES PATENTS

| | | | |
|---|---|---|---|
| 2,772,992 | 12/1956 | Kiefer et al. | 148/12 |
| 2,808,353 | 10/1957 | Leffingwell et al. | 148/12 |
| 2,851,384 | 9/1958 | Waxweiler | 148/12 |
| 3,490,956 | 1/1970 | Wilton | 148/12 |
| 3,650,848 | 3/1972 | Schneider et al. | 148/12 |
| 3,684,589 | 8/1972 | Brickner et al. | 148/12 |
| 3,694,192 | 9/1972 | Brickner et al. | 148/12 |

OTHER PUBLICATIONS

ASM Metals Handbook, 8th Edition, Vol. 4, 1969, p. 118.

*Primary Examiner*—W. Stallard
*Attorney, Agent, or Firm*—Forest C. Sexton

[57] ABSTRACT

A process for producing stainless steel sheet and strip by hot rolling a stainless steel slab to conventional hot band gauge and then cold rolling the hot rolled steel without removing the mill scale formed during hot rolling and thereafter continuous annealing and pickling the cold rolled steel at an annealing temperature in excess of 1,700°F and at line speeds up to 50 percent faster than previously possible.

1 Claim, No Drawings

METHOD OF PROCESSING STAINLESS STEEL STRIPS OR SHEETS

Matter enclosed in heavy brackets [ ] appears in the original patent but forms no part of this reissue specification; matter printed in italics indicates the additions made by reissue.

BACKGROUND OF THE INVENTION

Although most commercial grades of stainless steel sheet and strip are rolled on the same equipment used for producing carbon steel sheet and strip, the procedures used are somewhat different because of the inherent characteristics of stainless steel. That is, the processing of stainless steel slabs to sheet and strip usually requires much closer control of hot rolling temperatures, slower cold rolling strip speeds and more extensive surface conditioning. Processing of stainless steel sheet and strip therefore generally requires a more time consuming operation adding to the operational costs and tying-up annealing and pickling facilities. These factors alone add significantly to the cost of the stainless steel sheet and strip.

According to present commercial practices, stainless steel sheet and strip is produced by first thoroughly surface conditioning a stainless slab and then heating the slab to a suitable hot rolling temperature usually about 2,000°F. but may vary somewhat with different grades. The stainless slab is then hot rolled, usually to a conventional hot band gauge of about 0.10-inch, and sometimes annealed. Prior to cold rolling, the hot rolled and annealed steel must be thoroughly descaled by a treatment which usually involves pickling the steel in either an acid or caustic solution and for some grades involves a scale-breaking procedure prior to the pickle such as shot blasting. Most typical pickling operations provide a continuous treatment first in hot hydrochloric or sulphuric acid and then in a hydrofluoric-nitric acid mixture. If, after the first annealing and pickling operation some of the surface defects produced by hot rolling are still present, the steel may be annealed and pickled a second time, or the defects removed in a continuous coil grinding operation. After descaling, the stainless steel hot band is cold rolled to final gauge, typically about 0.050-inch, and then again continuous annealed, descaled and, if necessary, surface conditioned. Due to the low emissivity of conventional cold rolled stainless steel surface, the final anneal requires a relatively long holding time in order to completely recrystallize the sheet. Hence, slow line speeds are required when annealing cold rolled stainless steel.

Since the surface appearance after annealing and pickling is a dull finish, some stainless steels, depending upon end application, will need further processing to effect a bright shiny finish. This typically involves temper rolling the steel and may further include a mechanical polishing.

SUMMARY OF THE INVENTION

An object of this invention is to provide a new process for producing stainless steel sheet and strip which utilizes fewer processing steps and faster final annealing and pickling line speeds and therefore results in a faster and less costly operation. The process is particularly applicable to ferritic grades of stainless steel for industrial applications where bright surface finishes are not required.

Another object of this invention is to provide a process for producing stainless steel sheet and strip which requires substantially less time on annealing and pickling facilities thereby making such facilities more readily available for processing additional steels.

A further object of this invention is to provide a less costly process for producing stainless steel sheet and strip for industrial and automotive applications which will therefore reduce the price of such steels and enhance their utilization.

DESCRIPTION OF THE PREFERRED EMBODIMENT

As noted above, the process of this invention is particularly applicable to the low chromium ferritic grades of stainless steel for applications not having critical surface finish requirements, specifically applications such as automobile mufflers, heat exchangers industrial piping and other such non-decorative uses. Of particular significance is the fact that the inventive process will make available lower-cost ferritic stainless steels as are particularly desired by the automobile industry to manufacture low-cost engine mufflers suitable to meet future anti-pollution requirements. Although the process is not limited to ferritic stainless steels, it is for all practical purposes limited to production of stainless steels not having critical surface requirements. That is to say, the process can be used to produce austenitic or ferritic stainless steel grades with chromium contents up to about 19 percent with equal or comparable cost savings, but flawless, bright surface qualities cannot be expected for any grade.

According to one embodiment of this invention, any ferritic or austenitic stainless steel containing not more than 19 percent chromium, is completely processed to cold rolled sheet or strip substantially in accordance with the prior art practices, but with one notable exception, namely, the hot rolled steel is not descaled prior to cold rolling, but rather the hot band is cold rolled and subsequently annealed with the hot rolling mill scale still on the stainless steel surface. Accordingly, the inventive process first requires that a suitable stainless slab be hot rolled to conventional hot band gauges, i.e. about 0.10-inch, cooled and then cold rolled to final gauge without descaling after hot rolling.

Elimination of the descaling operation following hot rolling leads to the obvious advantages of reducing processing time and costs naturally resulting from elimination of one processing step, and rendering the descaling equipment available for processing other materials. Since the steel is subsequently cold rolled with mill scale on the surface thereof, the final surface quality of the steel is not sufficient to meet high standards where appearance is critical. Nevertheless, if the surface appearance is seriously defective and if desired, can usually be improved to more exacting standards by in-line polishing equipment. Of more significance however is the fact that cold rolling and subsequently annealing the steel without descaling the surface does not in any way adversely affect the steel's physical or chemical properties.

In addition to the above advantages cold rolling the stainless steel hot band without prior descaling leads to a surprising additional advantage, in that the anneal following cold rolling may be effected at line speeds 50 percent faster than possible by prior art processes. Specifically, the steel's cold reduced surface will consist of a dull, thin and surprisingly uniform oxide layer which will more readily and easily absorb heat during the final annealing operation. Because of this substantially increased emissivity, the cold rolled steel can be subsequently annealed with shorter holding times, i.e. up to 50 percent faster line speeds. Those skilled in the art will recognize that it is of course not possible to give actual line speed figures because the maximum line speed necessary to effect substantially complete recrystallization is dependent upon many variable factors. For example, the maximum line speed is dependent not only upon furnace length, but furnace geometry and efficiency, and upon steel grade, sheet thickness and even sheet width in some cases. Therefore, the maximum line speed will vary with different grades of steel, different sheet dimensions and different annealing furnaces. Nevertheless, whatever the maximum line speed may be at given conditions with the prior art practice, that line speed can be increased up to 50 percent when practicing this invention under the same conditions. Accordingly, the inventive process not only provides for elimination of the descaling step prior to cold rolling and the economies resulting therefrom, but further substantially reduces the annealing time after cold rolling to allow up to 50 percent faster line speeds during the anneal and pickling operation.

After the cold rolled stainless steel is annealed with a complete recrystallization, it is then pickled in accordance with conventional procedures. This usually involves continuously passing the steel from the annealing furnace into an acid or caustic pickling solution. In order to more effectively remove the scale, I prefer to anneal the sheet at temperatures between 1,800° and 1,850°F. Such slightly higher annealing temperatures will help to loosen the scale and make it more readily removed during the subsequent pickling.

By using the above process, I have been able to shorten production time for stainless steel sheet coils as much as two weeks. This could help significantly in reducing the price of such steels and provide quicker delivery times to customers.

The following example will serve to illustrate in more detail the process of this invention.

EXAMPLE

A Type 409 stainless steel slab weighing 20,520 pounds and measuring 7 inches thick and 49 inches wide was analyzed to consist of 11.24% Cr, 0.05% C, 0.64% Ti, 0.09% Al, and 0.26% Ni. This slab was hot rolled to 0.085-inch at a starting temperature of 2,250°F and coiling temperature of 1,250°F. After cooling the hot rolled steel was cold rolled without descaling to 0.050-inch on a 4-high cold reduction mill. The cold rolled strip was then continuously annealed in a 90-foot long annealing furnace, at a temperature of 1,850°F and at a line speed of 75 feet per minute. The normal line speed for this product processed by prior art practices is 55 feet per minute. Thereafter the strip was passed through a pickling solution of sulfuric acid and then a mixture of nitric and hydrofluoric acid where the cold rolled scale was readily removed. When finished, the stainless strip exhibited the following properties:

Rockwell Hardness B Scale: 73 at one end of the coil; 73 on the other.

Yield Strength (T): 43,275 psi at one end; 43,665 psi on the other.

Tensile Strength (T): 69,040 psi at one end; 69,200 psi on the other.

% Elongation in 2" (T): 31.5 at one end; 31.5 on the other end of the coil.

I claim:

1. In the process for producing stainless steel sheet and strip containing not more than 19% chromium wherein the steel is hot rolled to hot band gauge of about 0.10-inch, cooled, descaled, then cold rolled to final gauge and continuous annealed [at a temperature of from about 1700 to about 1850°F at a line speed sufficient] to effect substantially complete recrystallization and finally descaled; the improvement comprising eliminating the descaling step after hot rolling so that the steel is cold rolled and annealed with mill scale on the surface thereof thereby permitting a line speed up to 50% faster during said continuous anneal following the cold roll.

[2. The process of claim 1 in which said annealing temperature is within the range 1800 to 1850°F.]

* * * * *